United States Patent
Ries

(10) Patent No.: US 10,564,289 B2
(45) Date of Patent: Feb. 18, 2020

(54) METHOD FOR AUTHENTICATING SIGNALS RECEIVED FROM A CONSTELLATION OF SATELLITES

(71) Applicant: CENTRE NATIONAL D'ETUDES SPATIALES, Paris (FR)

(72) Inventor: Lionel Ries, Viviers les Montagnes (FR)

(73) Assignee: CENTRE NATIONAL D'ETUDES SPATIALES, Paris (FR)

(*) Notice: Subject to any disclaimer, the term of this patent is extended or adjusted under 35 U.S.C. 154(b) by 326 days.

(21) Appl. No.: 15/508,376

(22) PCT Filed: Sep. 2, 2015

(86) PCT No.: PCT/EP2015/070048
§ 371 (c)(1),
(2) Date: Mar. 2, 2017

(87) PCT Pub. No.: WO2016/034623
PCT Pub. Date: Mar. 10, 2016

(65) Prior Publication Data
US 2017/0285171 A1    Oct. 5, 2017

(30) Foreign Application Priority Data
Sep. 5, 2014 (FR) .................................... 14 58337

(51) Int. Cl.
*H04K 1/00* (2006.01)
*G01S 19/21* (2010.01)

(52) U.S. Cl.
CPC .............. *G01S 19/215* (2013.01); *H04K 1/00* (2013.01)

(58) Field of Classification Search
CPC ........ G01S 19/215; G01S 19/21; G01S 19/30; G01S 19/32; G01S 19/36
(Continued)

(56) References Cited

U.S. PATENT DOCUMENTS 6,594,582 B1* 7/2003 Quinn .................. G01S 5/0247
                                                342/357.36
7,952,519 B1* 5/2011 Nielsen ................ G01S 19/215
                                                342/357.59
(Continued)

FOREIGN PATENT DOCUMENTS

WO    2014/047378 A1    3/2014

OTHER PUBLICATIONS

International Search Report for PCT/EP2015/070048, dated Nov. 26, 2015.
(Continued)

*Primary Examiner* — Harry K Liu
(74) *Attorney, Agent, or Firm* — Meagher Emanuel Laks Goldberg & Liao, LLP

(57) ABSTRACT

The positioning signals broadcast by the GNSS constellations on civilian frequencies are likely to be counterfeited, while the use of authentic signals is becoming increasingly critical for certain applications. According to the invention, the authentication of GNSS signals is performed by analysis of consistency between the measurements of parameters characteristic of the signals (direction of arrival, amplitude, phase) and their state model, said state model taking account of an emulation by software and electronic means of displacements of the phase centre of the antenna and/or of the main lobe of the radiation pattern. Advantageously, these displacements are generated by a pseudo-random code. Advantageously, the analysis of consistency between measurements and models is a multiple-criterion analysis, the combination of criteria being chosen as a function of a reception quality indicator and/or of a presumed location.

17 Claims, 13 Drawing Sheets

(58) Field of Classification Search
USPC .................................................. 342/357.59
See application file for complete search history.

(56) References Cited

U.S. PATENT DOCUMENTS

| | | | |
|---|---|---|---|
| 2007/0200756 A1* | 8/2007 | Saito ...................... | G01S 19/09 |
| | | | 342/357.64 |
| 2007/0247362 A1 | 10/2007 | Strachan | |
| 2011/0095763 A1* | 4/2011 | Linscott .................. | G01V 3/12 |
| | | | 324/344 |
| 2012/0326925 A1 | 12/2012 | Chang | |
| 2013/0223626 A1* | 8/2013 | Edge ....................... | H04W 4/06 |
| | | | 380/270 |
| 2014/0035783 A1 | 2/2014 | Contarino et al. | |
| 2014/0285387 A1* | 9/2014 | Lindenmeier .......... | H01Q 5/321 |
| | | | 343/713 |
| 2015/0234053 A1* | 8/2015 | Psiaki ..................... | G01S 19/215 |
| | | | 342/357.51 |
| 2018/0196141 A1* | 7/2018 | Dickerson ............. | H04L 9/0869 |

OTHER PUBLICATIONS

Written Opinion for PCT/EP2015/070048, dated Nov. 26, 2015.
Psiaki M L et al., "GNSS Spoofing Detection using High-Frequency Antenna Motion and Carrier-Phase Data", GNSS 2013—Proceedings of the 26th International Technical Meeting of the Satellite Division of the Institute of Navigation, (ION GNSS+ 2013), Institute of Navigation 8551 Rixlew Lane Suite 360 Manassas, VA 2019, USA, Sep. 20, 2013 (Sep. 20, 2013), pp. 2949-2991.
Dehghanian V et al., "GNSS Spoofing Detection Based on a Sequence of RSS Measurements", GNSS 2013—Proceedings of the 26th International Technical Meeting of the Satellite Division of the Institute of Navigation (ION GNSS+ 2013), Institute of Navigation, 8551 Rixlew Lane Suite 360 Manassas, VA 2019, USA, Sep. 20, 2013 (Sep. 20, 2013), pp. 2931-2936.
Daneshmand Saeed et al., "A Low-Complexity GPS Anti-Spoofing Method Using a Multi-Antenna Array", GNSS 2013—Proceedings of the 25th International Technical Meeting of the Satellite Division of the Institute of Navigation (ION GNSS 2012), The Institute of Navigation, 8551 Rixlew Lane Suite 360 Manassas, VA 2019, USA, Sep. 21, 2012 (Sep. 21, 2012), pp. 1233-1243.
Broumandan A et al., "GNSS Spoofing Detection in Handheld Receivers Based on Signal Spatial Correlation", PLASN 2012—Proceedings of IEEE/ION Plans 2012, The Institute of Navigation, 8551 Rixlew Lane Suite 360 Manassas, VA 2019, USA, Apr. 26, 2012 (Apr. 26, 2012), pp. 479-487.
Rojas, Roberto, "Multilayer Reconfigurable GPS Antennas and Platform Effects", Ohio State University, ElectroScience Laboratory Sep. 2007, pp. 1-19, 20071115050.
Rao et al., "GPS/GNSS Antennas (GNSS Technology and Applications)", ISBN-13: 9781596931503, chapter 2.7, pp. 147-152, Nov. 2012.

* cited by examiner

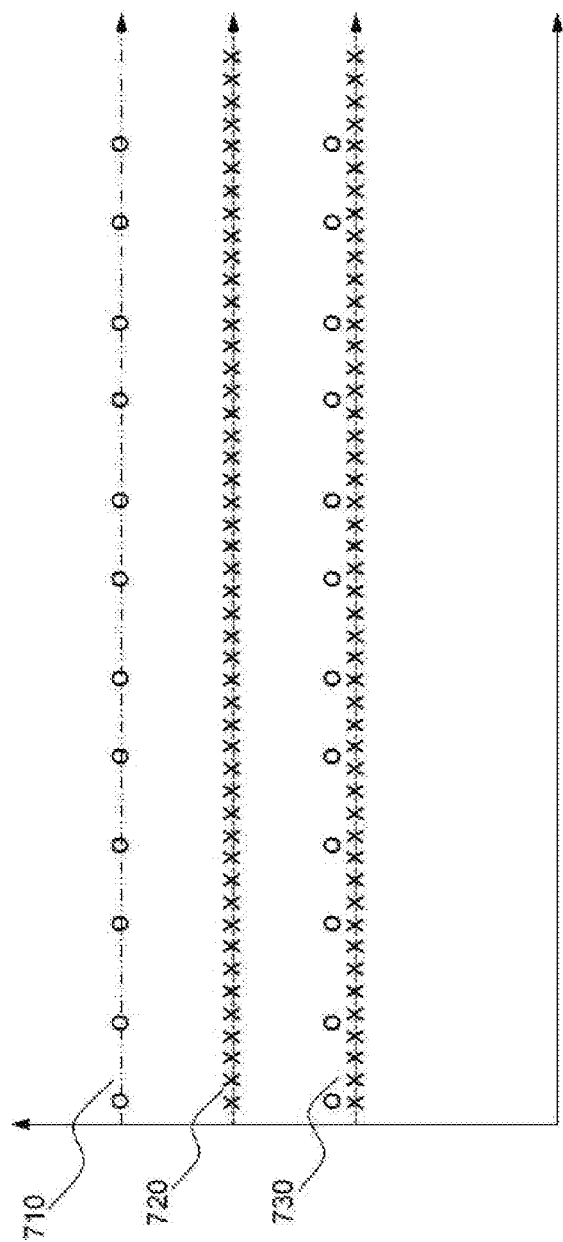

METHOD FOR AUTHENTICATING SIGNALS RECEIVED FROM A CONSTELLATION OF SATELLITES

FIELD OF THE INVENTION

The present invention applies to the signals originating notably from satellites of a navigation system. More specifically, the aim of the invention is to detect counterfeit signals and/or correct them.

BACKGROUND

Increasingly many critical applications use information supplied by constellations of navigation satellites (Global Navigation Satellite System or GNSS), either the position signal itself, or its time reference, or both. Such is the case of military applications, but subject to use by authorities accredited by the government controlling this constellation, the latter can use protected frequencies for which the signal benefits from a guarantee of authenticity. The applications of the civilian domain cannot as a general rule obtain such accreditations, even when they are very critical, as is the case with air navigation, maritime navigation or civilian security. They must therefore use the open signals, whose frequencies, wave forms and codes are known. These signals can therefore be counterfeited without excessive difficulty with a malign intent. Validating the authenticity of the navigation signal is therefore an issue that is critical in itself. "Spoofing" techniques ("spoofing" being the most commonly used terminology) have been developed, as have therefore "anti-spoofing" techniques.

A first category of conventional anti-spoofing methods comprises those consisting in correlating the receiver location information obtained from the GNSS signal with information originating from an external source reputed to be non-counterfeit (terrain mapping, altitude, inertial sensors, path travelled relative to an authenticated reference, etc). These methods are not however adequate, taken in isolation, for the level of certification imposed for certain applications embedded on aircraft such as the terrain collision avoidance system, which presupposes the integrity of each of the components of the system.

Anti-spoofing methods of a second category have therefore been developed to authenticate a GNSS signal on the basis of its intrinsic characteristics perceived by the receiver, in particular the radiation patterns of its antenna. The objective of these methods is to be able to eliminate the assumption whereby all the received signals would originate from a single direction (i.e. the source of the counterfeit signal), which is done by mechanically generating variations of the radiation pattern by displacing its phase centre. This prior art, which will be detailed later, notably comprises the international patent application published under the number WO2014/047378. The mechanical antenna diversity generation devices are bulky and complex to drive and to process, which demands a high computation capability. They are therefore unlikely to be incorporated with mass market receivers, for example smart phones.

Now, the integrity constraints will rapidly extend to the terminals of this type if, as seems to be proving the case, their usage for semi-critical applications, such as transport or electronic payment, expands.

In the field of land transport, geolocation and guidance by GNSS system are rapidly being rolled out to the general public: personal vehicle navigation assistance, reservation of cycles or motor vehicles for rent, real-time tracking of urban transport, etc. The user can use either a specific GNSS signal processing module (for example installed in his or her personal vehicle), or his or her smart phone which incorporates geolocation functions based on GNSS signals, and/or on identification of the serving cell of the radio communication network or Wifi terminal, and mapping functions.

In the electronic payment field, the use of a mark of QRCode type or of a chip of NFC (Near Field Communications) type already allows for sight but contactless payment with a smart phone. The time-stamping and the certification of the place of the transaction are natural means for authenticating these payments, on condition of being able to guarantee the integrity of this time-stamping and of this location, which is not these days possible.

SUMMARY OF THE INVENTION

The objective of the invention is to overcome this limitation of the prior art. To this end, it provides a GNSS signal anti-spoofing system comprising compact means for remotely and securely checking the radiation pattern of the antenna of the receiver.

To this end, the invention discloses a method for authenticating GNSS signals received by a receiver, said method comprising: generating control sequences emulating one or more of a scanning and a displacement of a reception cone by at least one GNSS signal reception antenna; transmitting to an authentication circuit logic configured to authenticate raw RF signals at the output of the at least one GNSS signal reception antenna; acquiring raw data representative of said GNSS signals, said raw data comprising one or more data representative of a phase angle, a phase centre, an amplitude or a carrier power; transmitting to the authentication circuit logic a message containing said raw data representative of said GNSS signals; producing by the authentication circuit logic of a GNSS signal authentication certificate by a processing receiving as input at least said raw RF signals at the output of said at least one reception antenna and said raw data representative of said GNSS signals.

Advantageously, the control sequences are generated by a pseudo-random code produced by an encryption key.

Advantageously, the message transmitted to the authentication circuit logic also comprises PVT data to locate the receiver.

Advantageously, the scanning of a reception cone comprises a generation of attenuated signals in at least one direction of said cone.

Advantageously, the displacement of a reception cone of said signal comprises a switchover between at least two antennas.

Advantageously, the raw RF signals at the output of said at least one GNSS signal reception antenna are digitized before transmission to the authentication circuit logic.

Advantageously, the digitized RF signals at the output of the digitization step are encrypted by at least a first part of the encryption key, before transmission to the authentication circuit logic.

Advantageously, said raw data representative of the GNSS signals are encrypted by at least a second part of said encryption key, before transmission to the authentication circuit logic.

Advantageously, the production of the GNSS signal authentication certificate is performed only if the latter satisfies a test consistency TC1 of phase measurements and/or of phase measurement differences between signals of different satellite axes with a model deduced from the control sequences emulating the scanning and/or the displacement of a reception cone.

Advantageously, the production of the GNSS signal authentication certificate is performed only if the latter satisfies a test of consistency TC2 of the directions of arrival measured by the receiver with expected directions determined by a model deduced from the control sequences emulating the scanning and/or the displacement of a reception cone.

Advantageously, the production of the GNSS signal authentication certificate is performed only if the latter satisfies a test of consistency TC3 of the powers, amplitudes and/or signal-to-noise ratios measured in directions of arrival measured by the receiver with expected powers, amplitudes and/or signal-to-noise ratios in expected directions, these parameters being determined by a model deduced from the control sequences emulating the scanning and/or the displacement of a reception cone.

Advantageously, the production of the GNSS signal authentication certificate is performed only if a test of consistency TC is satisfied, said test being defined by a linear combination of the tests of consistency TC1, TC2 and TC3, the weightings of said tests TC1, TC2 and TC3 being defined as a function of one or more of a GNSS signal reception quality indicator or of a position of the receiver estimated by a localization procedure not using the GNSS signals.

Advantageously, the localization procedure not using the GNSS signals is one or more of a terrain mapping, an inertial unit measurement, an identification of a radio communication network cell or of a Wifi terminal.

Advantageously, when there is an index of presence of non-authentic GNSS signals, analyzing the inter-channel correlation peaks on the raw signals at the output of said at least one reception antenna.

The invention also discloses a system for authenticating GNSS signals, comprising: one or more antenna arrangements, each antenna arrangement comprising at least one reception antenna; one or more GNSS signal receivers, each receiver configured to supply as output raw data representative of said GNSS signals, said raw data comprising one or more data representative of a phase angle, a phase centre, an amplitude or a carrier power; one or more processing circuit logics configured to generate a control sequence emulating one or more of a scanning or a displacement of a cone of reception of said signals by the antenna arrangement; authentication circuit logic configured to produce a GNSS signal authentication certificate by a processing receiving as input at least raw RF signals at the output of said at least one reception antenna and said raw data representative of said GNSS signals.

Advantageously, the system of the invention comprises a server, said server to manage encryption keys and at least some of the functions of the at least one authentication circuit logic.

Advantageously, at least one or more of the antenna arrangements or the receivers are located in terrestrial motor vehicles.

Advantageously, the system of the invention comprises a plurality of processing circuit logics, at least some of the receivers being installed in a vicinity of electronic payment terminals.

The invention also discloses a GNSS signal reception antenna unit, comprising: an antenna configured to receive GNSS signals; a set of electronic components configured to emulate one or more of a scanning or a displacement of a reception cone of said antenna under the control of a sequence generated by a pseudo-random code as digital input for said unit; an analogue/digital converter configured to supply to at least one analogue or digital output a sampling of the raw RF signals.

The invention also discloses a GNSS signal authentication equipment, comprising: A) a digital port configured to receive encryption keys; B) signal processing logic configured to acquire, at a predetermined sampling frequency: i) raw RF signals at the output of at least one GNSS signal reception antenna, ii) raw data representative of said GNSS signals, said raw data comprising one or more data representative of a phase angle, a phase centre, an amplitude or a carrier power; C) a processing circuit configured to: i) generate a pseudo-random code from an encryption key, said code being itself configured to generate a control sequence emulating one or more of a scanning or a displacement of a reception cone by said at least one GNSS signal reception antenna; ii) acquire or produce a variables state model at the output of the signal processing logic, said state model being adapted to the control sequence; iii) execute at least one test of consistency between at least a part of the data measured at the output of the signal processing logic and their state model.

Another advantage of the invention is that it makes it possible to distribute the algorithmic processing operations for validating the absence of spoofing over different processors, which makes it possible to apply the method to terminals having only the capabilities of a standard smart phone.

Another advantage of the invention is to be able to be implemented in a plurality of physical architecture types, which facilitates use in a large number of usage scenarios.

Another advantage of the invention, in some of its embodiments, is to use all or part of a same pseudo-random sequence generated by one or more encryption keys to control the radiation pattern of the antenna and to protect the exchanges of data between the different elements of the system.

Another advantage of the invention is to make it possible to combine different analysis techniques to adapt the authentication procedures to the trend of the usage scenarios and of the spoofing techniques.

Another advantage of the invention is to favour a centralization of the data on the spoofing making it possible to improve the detection algorithms.

BRIEF DESCRIPTION OF THE DRAWINGS

The invention will be better understood, and its different features and advantages will emerge from the description of its various embodiments and the following figures attached to the present application:

FIG. 7 illustrates the time sequencing of the computations of the processing module and of the authentication module, according to a number of embodiments of the invention;

DETAILED DESCRIPTION OF THE INVENTION

Figure 1A:
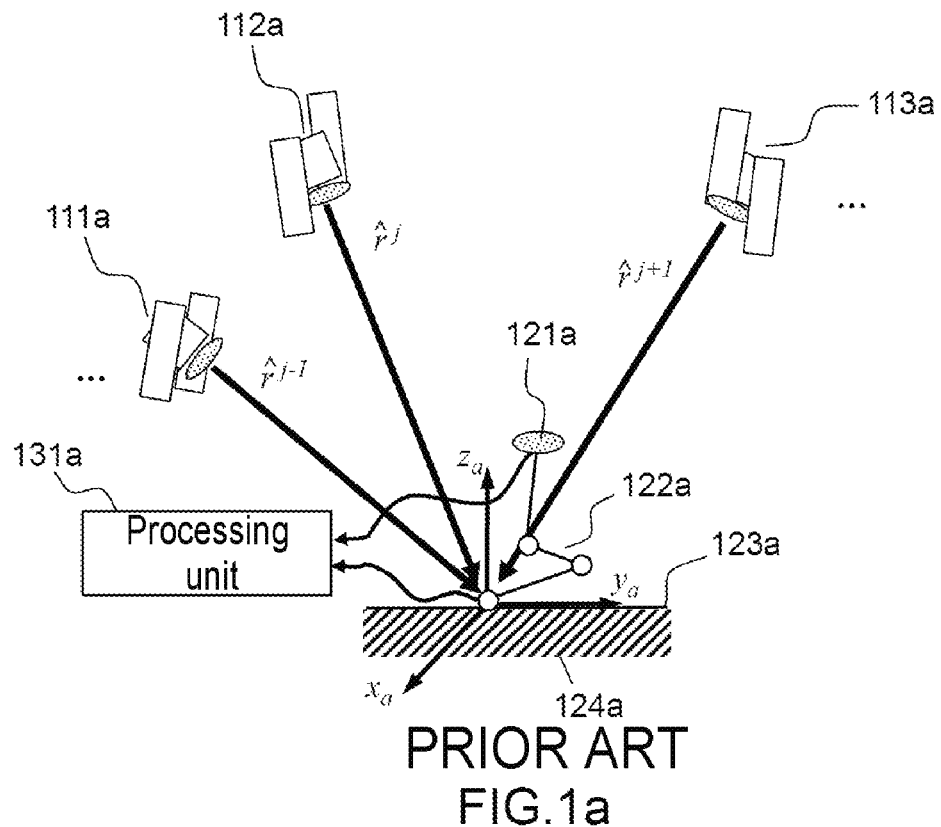
FIGS. 1a and 1b respectively represent a GNSS receiver with antenna diversity not subject to spoofing and a receiver of the same type subject to spoofing, in embodiments of the prior art.
Figure 1B:
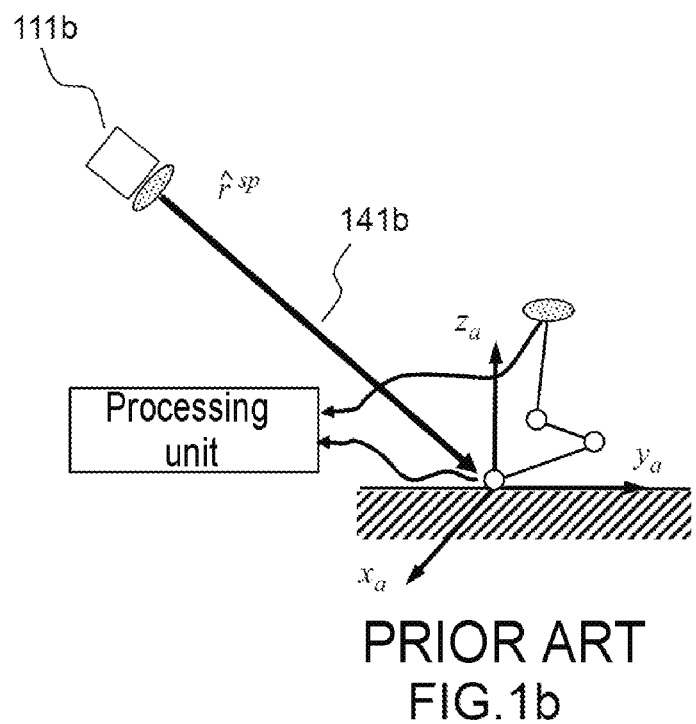

FIGS. 1a and 1b respectively represent a GNSS receiver with antenna diversity not subject to spoofing and a receiver of the same type subject to spoofing, in embodiments of the prior art.

To ensure the authentication of a GNSS signal, the assumption is made that the counterfeit GNSS signals are sent from a single direction in space, which can correspond to a real satellite axis, whereas the authentic signals originate from a plurality of satellites. In effect, an attack simulating signals originating from a plurality of satellite axes is very complex to mount notably because of the need to accurately align the phases of the signals of the satellite axes. To detect this uniqueness of transmission direction, the trend in time of the phases of the carrier waves assumed to originate from a plurality of satellite axes is analyzed, as explained as commentary to FIG. 2 below. Such a prior art system is notably described by the publication by Psiaki et al., "GNSS Spoofing Detection Using High-Frequency Antenna Motion and Carrier-Phase Data", Institute of Navigation, GNSS, 2013, and in the patent application WO2014/047378 already cited.

In the case of unspoofed signals of FIG. 1a, three satellites, j−1, j and j+1 (111a, 112a, 113a) send their signals to an antenna 121a which has a special configuration: it can for example be mounted on a surface of a building or of a vehicle 124a, via an articulated chain 123a. The aim of this special configuration is to provoke movements of the phase centre of the antenna. The antenna must be protected by a radome to prevent its detection. A reference frame $(x_a, y_a, z_a)$ has an origin 123a, relative to which the measurements and computations will be performed. The signals received by the antenna 121a are processed by the processing module 131a.

In FIG. 1b, a spoof 111b transmits counterfeit signals supposed to reproduce those of a number of satellites in view. However, all the signals originate from a single direction 141b, even if the spoof introduces into the computations of the PVT by the receiver 131a false values of the directions of the axes of the satellites 111a, 112a and 113a.

In the case of FIG. 1b, the j signals supposed to originate from j satellites are superposed, whereas, in the case of FIG. 1a, the j signals originating from the j satellite axes are identified as different.

Figure 2:
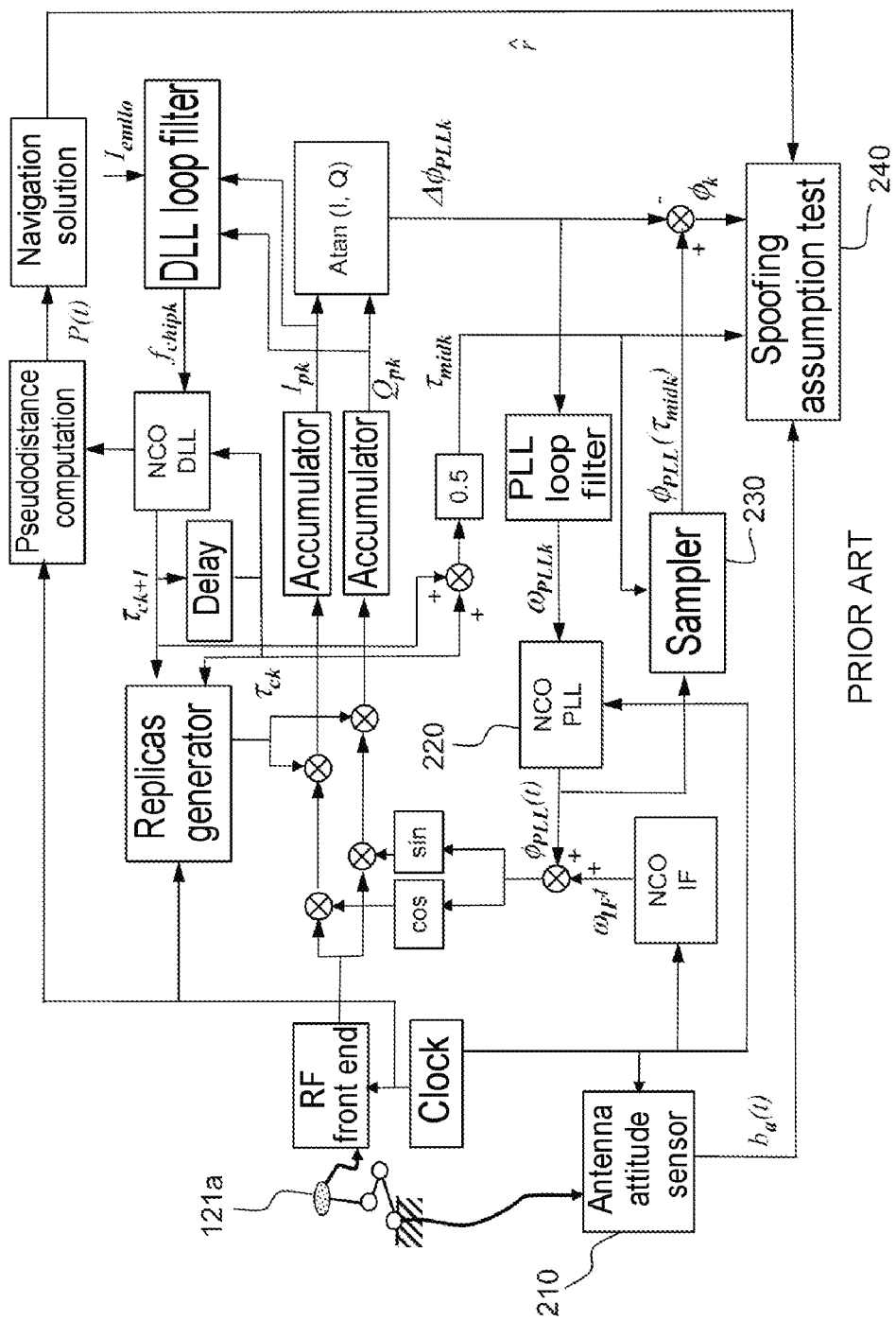
FIG. 2 represents an architecture diagram of a GNSS receiver including a spoofing detection function, according to the prior art.

FIG. 2 represents an architecture diagram of a GNSS receiver including a spoofing detection function, according to the prior art.

The processing device compares the measurements of the phases taken in the GNSS receiver with their modelling taking into account the movements of the antenna provoked by its articulated chain.

According to the prior art, the receiver of the GNSS signals is modified to process the signals received by the articulated antenna 121a. An additional phase loop 220 extracts a transform of the carrier phase, the aim of the transformation being to eliminate the attenuation of the effects of the movements of the antenna which results from the signal processing performed in a standard antenna. The signals are then sampled by a sampler, for example of median filter type, 230, and supplied to an assumption test function 240 which also receives as input the receiver navigation solution and the antenna attitude parameters measured by a sensor 210. The attitude parameters make it possible to compute the phase model resulting from the combination of the movements of the antenna with those expected of the satellite axes, and to compare the values computed from this model with the measurements of the receiver.

The test 240 of the assumption of authenticity of the signals can use various data analysis methods, for example a Monte-Carlo simulation.

According to the prior art, it is therefore necessary to have a specific articulated antenna which executes movements of relatively high frequency, preferably provided with a radome and a receiver modified in a particular manner. This creates constraints incompatible with use on a consumer scale. The invention makes it possible to overcome these limitations.

Figure 3:
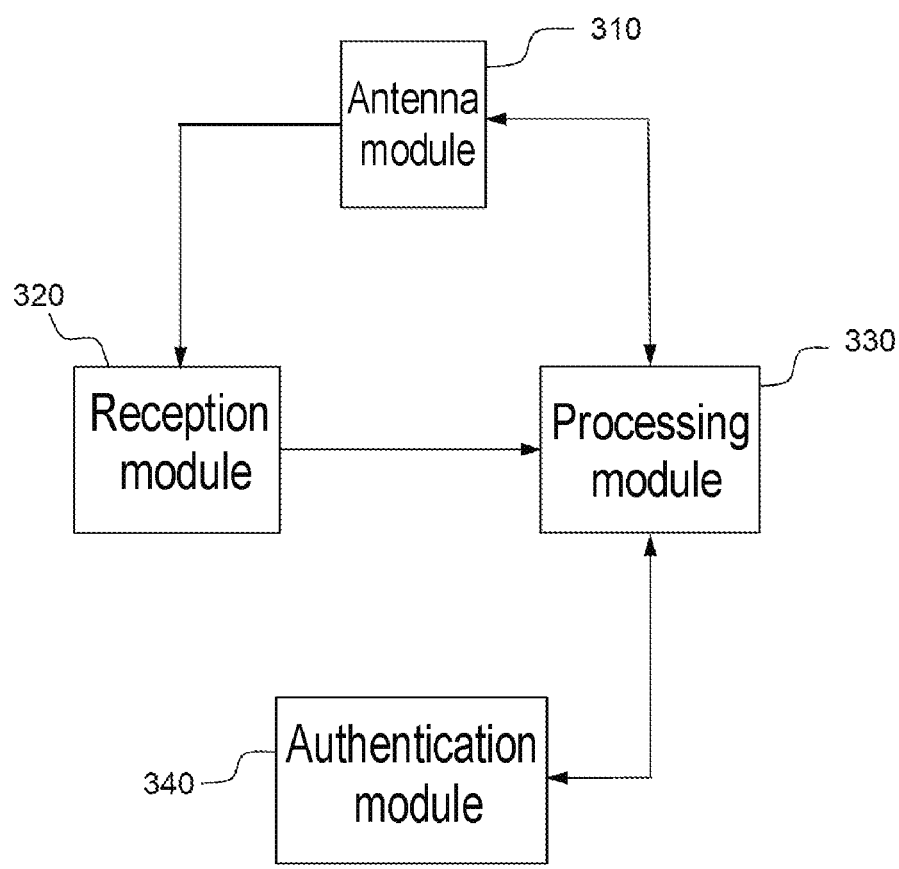
FIG. 3 represents a functional architecture diagram for implementing the invention, in a number of its embodiments.

FIG. 3 represents a functional architecture diagram for implementing the invention, in a number of its embodiments.

In certain embodiments of the invention, the GNSS signal authentication system uses four separate functional building blocks, some of them being able however to be grouped together in a same physical element:

an antenna module, 310;
a GNSS signal reception module, 320;
a processing module, 330;
an authentication module, 340.

The concept of module is used in the description to mean a grouping of basic subfunctions in a same functional entity. Depending on the applications, the optimization of the physical architecture of the system will be able to involve a modification of the distribution of certain subfunctions between the modules.

The antenna module, 310, can comprise one or more antennas, organized if appropriate in an array to create the radiation diversity making it possible to then perform the authentication processing operations. It will also preferentially comprise electronic components to drive the antenna array and generate an electronic scanning inducing either a displacement of the phase centre of the antenna or of the antenna array, or a spatial scanning of a radiation cone, or both movements, simultaneously or successively. As a variant, the scanning generation components may be located in the processing module. A person skilled in the microwave art knows how to choose and configure the components that make it possible to perform the electronic scanning functions for a given antenna array. Antennas of this type have already been produced for the reception of GNSS signals. By way of example, it is for example possible to form, by computation, a radiation pattern of an antenna array made up of radiant elements in numbers that can range from four arranged in a square to several tens arranged in a structure for example with central symmetry. A computation code is used to assign variable weights to the different radiant elements, which makes it possible to orient the directions of the lobes of the pattern in a desired axis. See for example, Rao et al., "GPS/GNSS Antennas (GNSS Technology and Applications)", November 2012, ISBN-13: 978-1596931503, chapter 2.7, pages 147-152). It is also possible to use patch antennas whose radiant elements are surrounded by a parasitic ring structure whose effect on the surface waves is modified by switching components distributed over the ring-form architecture. See for example, Rojas, "Multilayer Reconfigurable GPS Antennas and Platform Effects" Ohio State University, September 2007.

As a variant, it is possible to be content with switching between two or more antennas, for example patch antennas, distributed according to an appropriate geometry, so as to displace the phase centre of the radiation pattern.

A scanning of the order of ten or so Hz allows for an authentication in quasi-real time whereas a slower scanning will allow for a verification every minute for example. A robust solution may be based on a scanning at randomly determined slower instants ranging from a minute to an hour, notably as a function of an external parameter such as the location.

The GNSS signal reception module, 320, can be a single-frequency or multifrequency receiver. It can be provided with precision computation functions (Precise Point Positioning, or PPP), augmented signal reception functions (of EGNOS—European Geostationary Navigation Overlay Service-type, or of WAAS—Wide Area Augmentation System-type). However, it can also be a simple receiver incorporated in a smart phone. It is however necessary to be able to sample raw data from the receiver, notably data representative of the phase or of the amplitude of the carriers, even raw radiofrequency (RF) signals, and, if appropriate, send to it signals from an auxiliary external antenna, and therefore for the inputs/outputs of its GNSS chip to be accessible to the applications embedded on the smart phone.

As a variant, the reception module 320 can be a module external to the receiver for which the received signal is to be authenticated. A parallel reception module receiving the same signals substantially at the same point will behave like the target receiver.

The processing module 330 performs the driving of the electronic scanning by the antenna 310. In a preferred embodiment of the invention, this driving is performed by a pseudo-random code generated by an encryption key. The processing module comprises at least one processor and a memory. The processing module can also execute all or some of the signal analysis algorithms preparatory to the authentication of the GNSS signals. It is provided with capabilities for communication, on the one hand with the antenna, on the other hand with the processing module, finally with the authentication module 340. The processing module can be linked to the antenna module and to a reception module by wired links or by Bluetooth or Wifi links. It can be linked to the authentication module by a cellular link, when this authentication module is remote. The processing module 330 can also be linked by a communication bus to a local area network, using either a standard protocol of Ethernet, RS432 or CAN type, or a protocol specific to the antenna 310 and to the reception module 320, if the different objects 310, 320 and 330 are located in a same place, notably a vehicle interior, or a commercial centre, as detailed later in the exemplary scenarios of use of the invention.

The authentication module 340 performs in particular the supply to the processing module of the encryption keys and the procedure for validating the authentication of the GNSS signals from the data received from the processing module 330. It can also execute all or some of the signal analysis algorithms preparatory to the authentication of the GNSS signals. It can also store the history of the validations in memory, in order to identify the spoofs which have already been identified in preceding validation procedures. The authentication module can, wholly or partly, be installed on a remote server. It is then operated by a trusted third party which distributes the encryption keys to subscribing users. The users can be registered by the operator by a procedure which makes it possible to reserve the distribution of the encryption keys only to users having trust attributes which are validated in the registration procedure. The operator normally manages the repudiation of the keys which have been used in conditions not conforming to determined usage rules, or which are subject to the taking-out of a subscription of determined duration. The operator can also be provider of positioning services, or an operator of a GNSS network, or an operator of value-added services complementing positioning services, notably an operator of a particular application, such as transport services or payment services, according to usage scenarios described later in the description.

In certain configurations of implementation of the invention, the antenna module 310, the reception module 320 and the processing module 330 can be included in a same unit. In other configurations, the antenna module 310 and the processing module can be placed in a same unit, as described below.

FIGS. 4a, 4b, 4c, 4d, 4e and 4f represent different physical architecture variants, according to a number of embodiments of the invention.

Figure 4A:
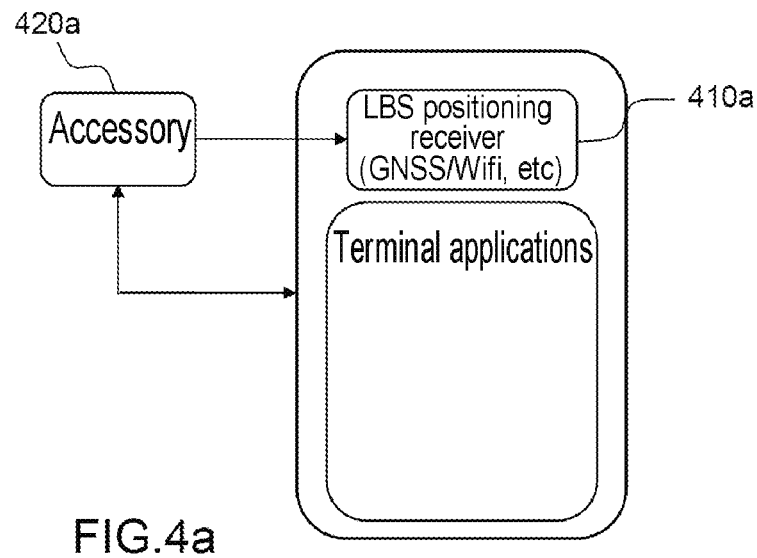
FIGS. 4a, 4b, 4c, 4d, 4e and 4f represent different variant physical architectures, according to a number of embodiments of the invention.

FIG. 4a shows an external accessory 420a to a GNSS signal reception module 410a, which can include elements of the antenna module 310 and of the processing module 330. The GNSS signal reception module GNSS 410a can, for example, be a smart phone, which will have been specially configured to implement the invention. The GNSS signal reception module can be coupled to a positioning module using other means, such as an identification of the antenna of a cellular radio communication network or the terminal of a Wifi network in the vicinity of which the apparatus is located. A hybridation with cartographic location and/or inertial sensors makes it possible to take over from the GNSS signals in case of masking. These hybrid location devices are known by the acronym LBS (Location Based System).

Figure 4B:
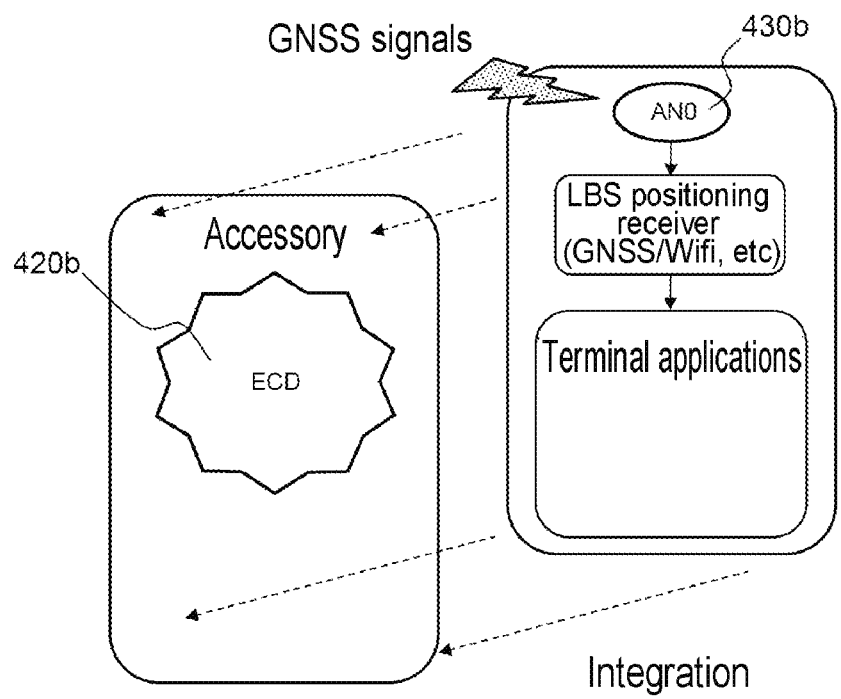

In the variant of FIG. 4b, the accessory 420a comprises functions 420b for driving the antenna of the GNSS signal receiver 410a. The hardware elements (electronic components) and software elements (software for generating encryption keys to create the pseudo-random codes intended to vary the radiation pattern of the antenna AN0, 430b) which are necessary to drive the displacement and the orientation of the antenna are then installed in the ECD (Pattern Configuration Elements) functions, 420b, of the accessory.

Figure 4C:
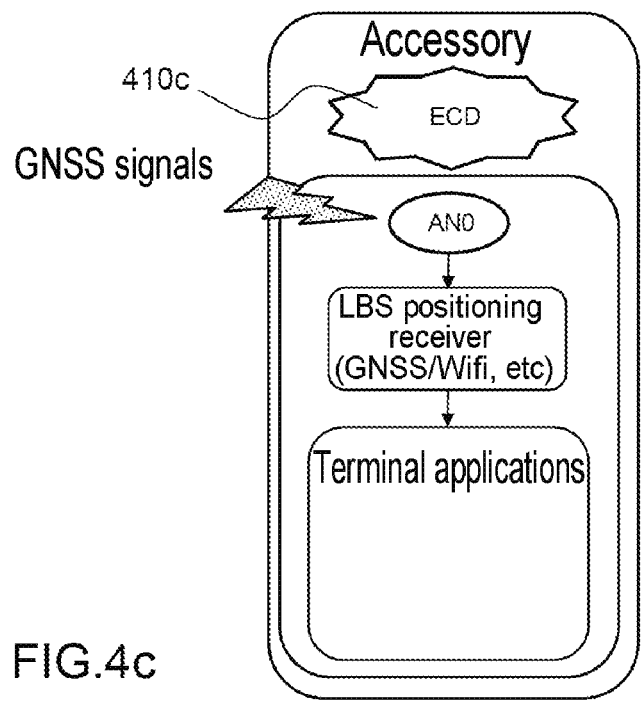

In the variant of FIG. 4c, the distribution of the functions is identical to that which is represented in FIG. 4b, but the accessory is formed to be able to serve as shell 410c for the smart phone 410a, which facilitates its use.

Figure 4D:
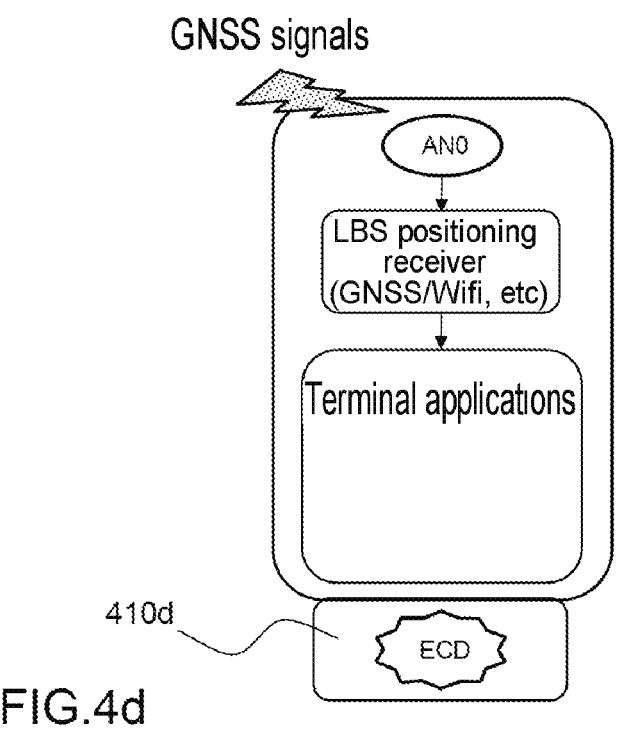

In the variant of FIG. 4d, the distribution of the functions is identical to that of FIGS. 4b and 4c, but the shell 410c is replaced by a dongle 410d, connected under the smart phone 410a.

Figure 4E:
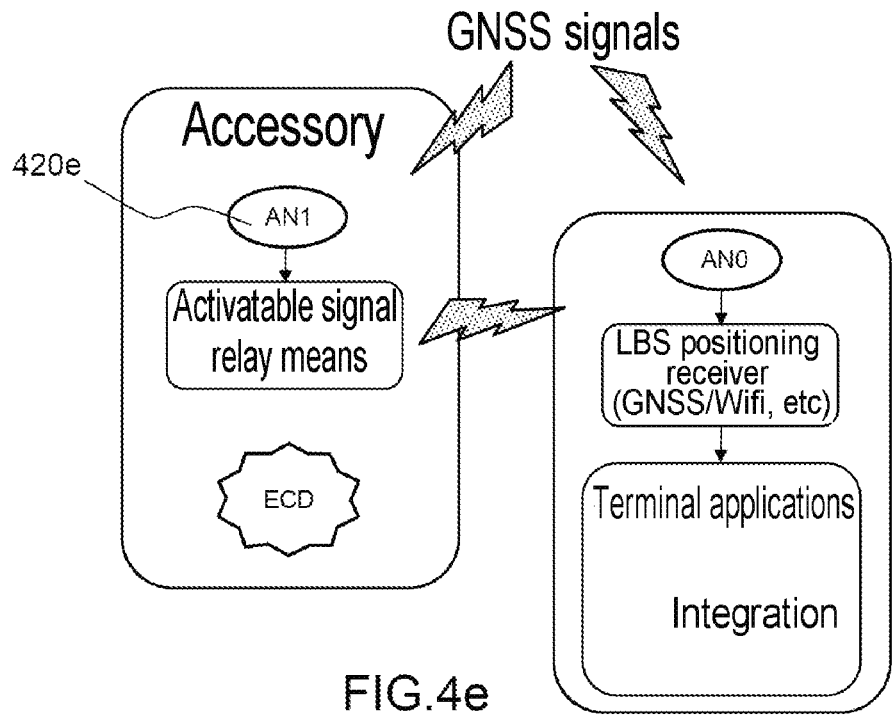

In the variant of FIG. 4e, the accessory 420a comprises an antenna AN1, 420e, and the system is configured to perform the driving of the radiation patterns of the antennas 430b and 420e.

Figure 4F:
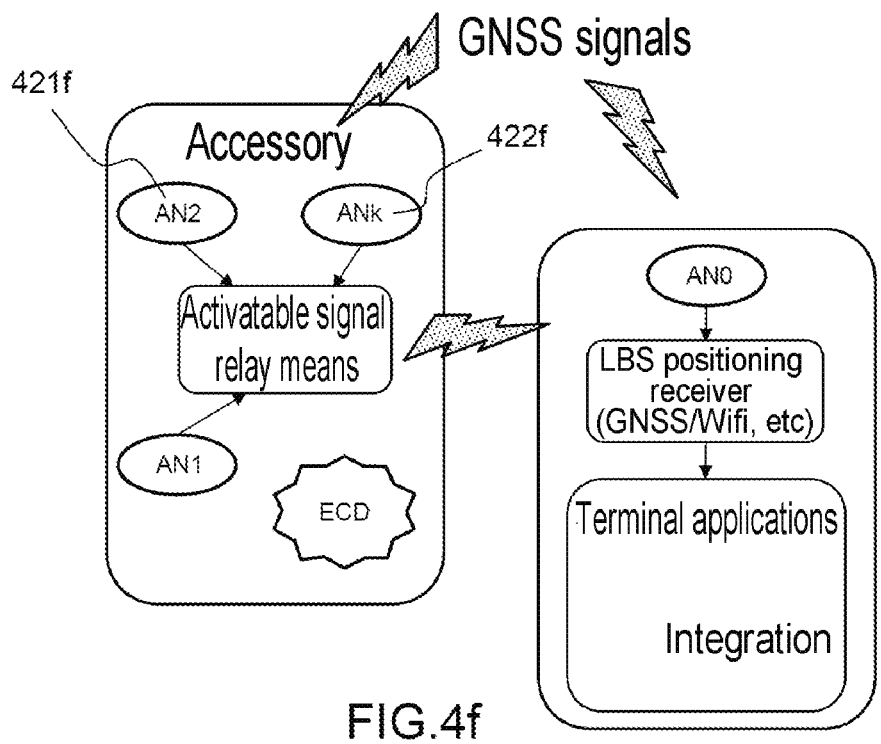

In the variant of FIG. 4f, the accessory 420a comprises a plurality of antennas AN1, 420e, AN2, 421f, ANk, 422f, and the system is configured to perform the driving of the radiation patterns of the antennas 430b, 420e, 421f, 422f.

In the variants of FIGS. 4e and 4f, the accessory 420a and the GNSS signal receiver 410a can be situated at a certain distance, and linked by a local area or remote network, as in the variants of FIGS. 8 and 10, which are detailed later in the description. Thus, a wide variety of configurations is possible for implementing the invention, according to the usage scenarios.

Figure 5:
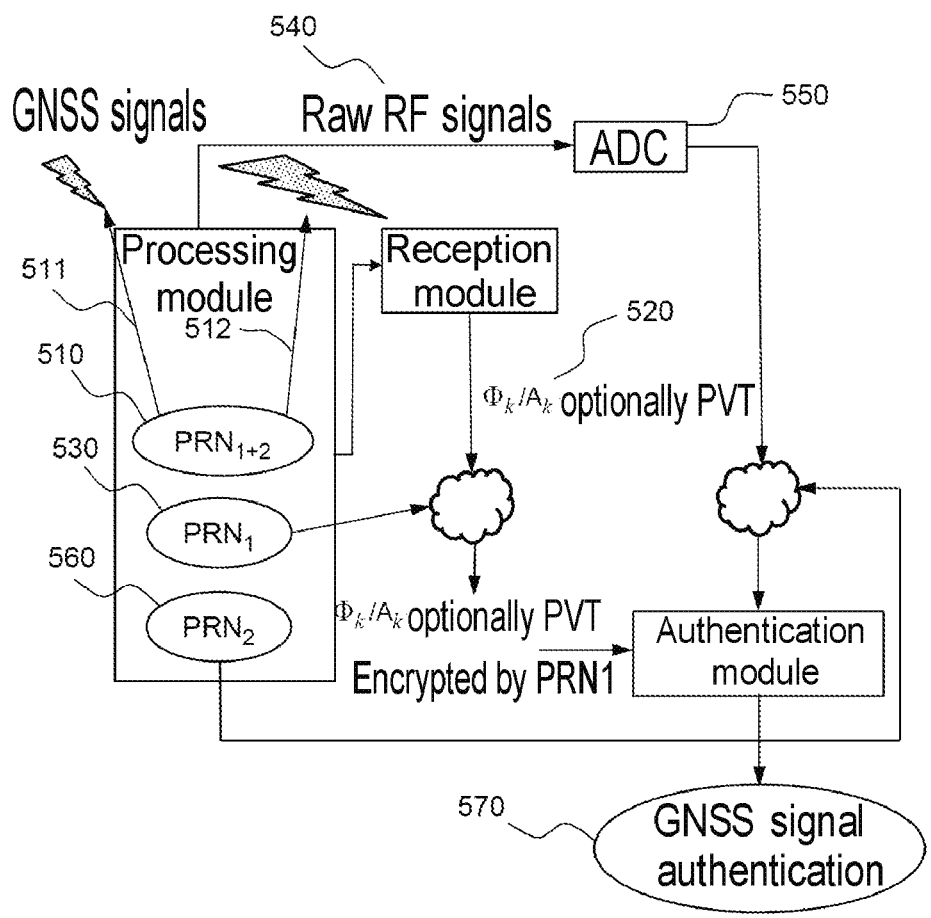
FIG. 5 represents a theoretical block diagram of the main processing operations, according to a number of embodiments of the invention.

FIG. 5 represents a block diagram of the main processing operations, according to a number of embodiments of the invention.

The processing module 330 comprises a function 510 for generating a pseudo-random code $PRN_{1+2}$ from an encryption key. The encryption key can be acquired from a server, according to a predetermined periodicity. It can be itself generated by a pair of keys, symmetrical and asymmetrical so that its transmission to the processing module is secured according to the rules of the art. The pseudo-random code is used to generate (511, 512) a radiation pattern of the antennas AN0, AN1, AN2, ANk, that is variable. The variation of the radiation pattern of the antennas can relate either to the phase centre or to the orientation of the reception lobes, or to both at the same time, according to modalities described above.

The reception module 320 comprises a function 520 for extraction, at a sampling frequency k, of the phases $\Phi_k$ and/or of the amplitudes $A_k$ of the carriers acquired from the satellite axes j in sight and, optionally, for computing the PVT (position, velocity, time) point. The processing module extracts, 530, from the encryption key, a subset $PRN_1$ of the encryption key, said subset being used to encrypt the data $\Phi_k/A_k$ for transmission to the authentication module 340. The reception module can simultaneously or sequentially transmit other elements such as the identifier of the receiver, PVT, data from sensors such as accelerometers, magnetometers, infrared sensors, distance sensors or intrusion or integrity (tampering) detectors.

The processing module 330 also comprises a function 540 for extracting (raw) GNSS RF signals at the output of the antennas. Optionally, the RF signals pass through a repeater. The (raw) RF signals are expressed by the following generic formula:

RF raw (j,radiation pattern p)=RF raw (j,antenna 0)+contribution (DoAj,radiation pattern p variation)

in which j is the index of a satellite axis;

the radiation patterns p are those generated by the pseudo-random code;

the antenna 0 is a fixed reference antenna;

DoAj is the direction of arrival of the signal from the satellite axis j.

The (raw) RF signals can be digitized in an analogue/digital converter CAN, 540. Optionally, they are then encrypted by another part of the encryption key extracted, 550, from the main encryption key.

The encrypted (raw) RF signals are then transmitted to the authentication module to be processed in combination with the data $\Phi_k/A_k$ for the authentication of the GNSS signal in a step 570. The comparison can be made by a combination of means as detailed later as commentaries to FIGS. 6a and 6b.

At the output of step 570, the signal is therefore authenticated or declared counterfeit. A validation signal can be sent to the processing module, or to applications which use the signal. It can also be broadcast to other subscribing user terminals situated in the vicinity of the first terminal on which a spoofing has been detected. Different learnings based on temporal and/or geographic learning schemes can also be combined with the validation algorithms.

Figure 6B:
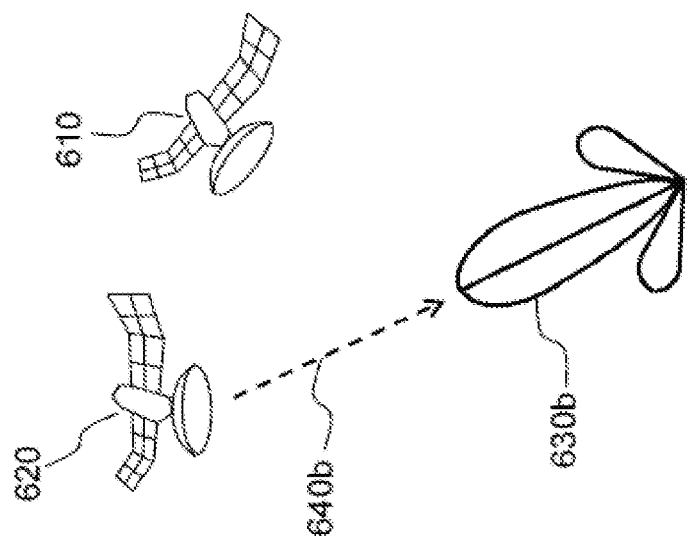
FIGS. 6a and 6b illustrate an antenna processing mode implemented to produce the invention, according to a number of its embodiments.
Figure 6A:
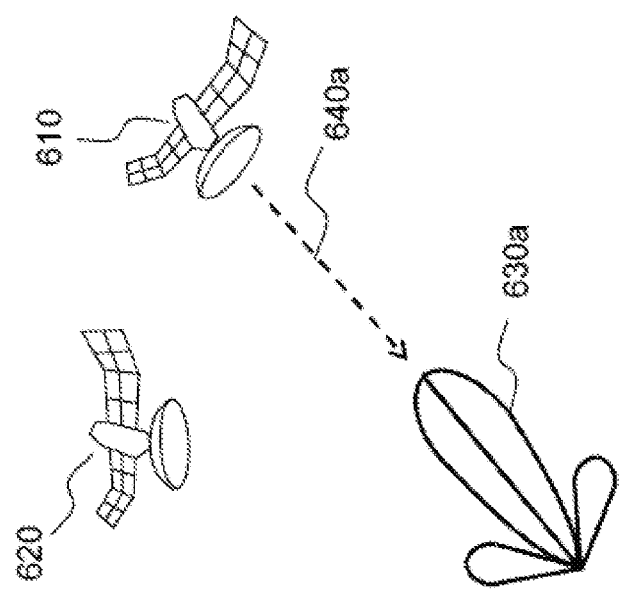

FIGS. 6a and 6b illustrate an antenna processing mode implemented to produce the invention, according to a number of its embodiments.

The two figures illustrate a case of implementation of the invention in which a single antenna, for example AN0, is used. In FIG. 6a, the maximum amplitude of the signal on the main lobe 630a of the radiation pattern of the antenna is located at an instant t1 in the axis 640a of the satellite 610. In FIG. 6b, the maximum amplitude of the signal on the main lobe 630b of the radiation pattern of the antenna is located at an instant t2 in the axis 640b of the satellite 620.

The rotation of the axis of the main lobe of the antenna is driven by electronic circuits of diode and/or ferrite type, as indicated above. The characteristic values of the components are chosen as a function of the orientations of the main and secondary lobes to be emulated according to rules known to those skilled in the art according to the work by Basrur Rama Rao cited previously, and the bibliographic references. These components are driven by a microcontroller and a digital/analogue converter, the microcontroller being itself driven by the pseudo-random code sequences $PRN_{1+2}$ generated by the encryption key. The latter can itself consist of a symmetrical key and an asymmetrical key.

The principle can be extended to an array with two or more antennas, such as those illustrated by FIGS. 4e and 4f. In this case, each antenna of the array has a radiation pattern which has a main lobe at a given instant. If there is a switchover from one antenna to the other either according to a predetermined frequency or according to a sequence driven by a part of the pseudo-random code, the phase centre of the received signal is displaced at the same time, which makes it possible to analyze the consistency of the phase jumps, with the reception model which would be consistent with the configuration of the satellite axes at a given instant.

It is also possible to use the pseudo-random code to control the generation of reception amplitude zeros.

The combination of the variations of orientation of the main lobe, of the displacements of the phase centre and of the zeros makes it possible to provide a number of types of checks, which can themselves be combined, for example:

the checking of the consistency of the measurements of phases and of phase differences between antennas with an "expected" estimation thereof generated from other, possibly a priori, information;

the checking of the consistency of the measured direction of arrival with an "expected" estimation thereof, generated from other, possibly a priori, information;

the checking of the consistency of the jumps and differences of amplitude of the signal, or of value of the signal-to-noise ratio, with an "expected" estimation thereof, generated from other, possibly a priori, information;

the checking of the consistency of the amplitude of the signal, or the value of the signal-to-noise ratio, with an "expected" estimation thereof, generated from other, possibly a priori, information.

By way of illustration, the analysis of the similarity of the variations of phase measurements obtained from different satellites provoked by the modifications of the parameters of the reception antenna or antennas (phase centre for example) considers two assumptions, that of counterfeit signals and that of non-counterfeit signals, compares them and chooses the most probable assumption (test of consistency TC1).

An analysis of the consistency between the directions of arrival measured by the processing module and the expected directions of arrival, generated from information originating from the signals received by the GNSS signal reception module can be performed by comparison with external information obtained from motion or attitude sensors, a 3D model of the environment, or a rough estimation of position originating from means other than a GNSS, or, in the context of a GNSS model, from positions of the satellites extrapolated using a force model (orbital model), etc. (test of consistency TC2).

It is also possible to perform an analysis of the similarity between the reception powers of the signals, following the insertion of strong attenuations (or of zeros) into the radiation pattern of the reception antenna or antennas. This attenuation is repeated regularly for different directions of arrival until all of the coverage of interest has been covered (for example 4 π steradians). In this way, a form of sounding of the reception environment is conducted (test of consistency TC3): direct or indirect measurement of the power of the signals received in a direction of arrival. This analysis considers two assumptions, that of counterfeit signals and that of non-counterfeit signals, compares them and chooses the most probable assumption. In an exemplary embodiment, if all the signals are attenuated simultaneously, it is probable that they originate from the same direction of arrival, therefore there can be suspicion of fraud. If only a limited and changing subset of signals is attenuated, the signals probably originate from different directions and there can be a better level of trust in the signals received. In another exemplary embodiment: the quality of the signal or signals originating from a satellite present in the "attenuated" direction of interest will be affected with regard to the quality of the signals from the other satellites, the reception quality will be able to be deduced from indicators provided in the receiver or generated from these signals or measurements: measurement noises, signal-to-noise ratio, etc. If the signal is affected by a degradation of quality at the expected instants, it originates a priori from the right direction of arrival and would be difficult to counterfeit. On the other hand, if the signals linked to the directions of interest do not exhibit any degradation of quality at the expected instants, they can be suspected of counterfeiting.

It is also possible to perform an analysis of the consistency between the reception powers of the signals in a particular direction and the expected powers, generated from information originating from the signals received by the GNSS signal processing module, and from external information such as motion, or attitude sensors, a 3D model of the environment, rough position other than GNSS (telephone network cell, Wifi cell), position of the satellites extrapolated using a force model (orbital model), antenna pattern of the user receiver, etc.

It is possible to combine all or part of these analyses with, for example, a weighting coefficient, the chosen analyses depending on the reception environment, defined for example by a reception quality indicator generated from the GNSS signals received by the user (signal-to-noise ratio, estimator based on the outputs of the correlators, etc.) or generated from the estimated position of the user and a 3D mapping making it possible to know if such or such a satellite is masked, affected by multiple paths, etc.

Depending on the details of their implementation, the different analyses defined above can be applied:

to the raw RF data generated by the GNSS signal processing module, which presents the advantage of simplicity (use of the existing functions of the GNSS receiver of the equipment) but the drawback of limiting the algorithms because they have to be adapted to the operation of the existing receiver.

or to a capture, of given duration, of the digitized raw RF signals output from analogue/digital conversion ("snapshot" of the RF signal from the antenna module). This solution makes it possible to implement signal processing and fraud detection algorithms that are totally optimized for the targeted application, but requires an ad hoc interface to recover the capture of the signal and a significant computation power to perform the processing operations.

According to a variant based on the capture of the digitized RF signals, the capture or at least the transmission of the signals is performed at intervals spaced apart in time to reduce the communication bandwidth. Also, the processing operations can be wholly or partly deferred if the authentication is used primarily as a posteriori checking element.

According to a variant, in the case of suspicion of fraud, it is possible to estimate an authentic position and fraudulent positions and identify the authentic position. This algorithm is executed directly on a capture of the signals at the output of analogue/digital conversion. This algorithm analyzes the correlation functions produced in the different successive instantiations of the pattern of the antenna and/or of its phase centre, and in particular their difference, to identify the correlation peak which corresponds to the authentic signals and set aside the correlation peak corresponding to the fraudulent signals.

According to the cases of use, whether they are applied to raw measurements obtained from the user receiver or algorithms specific to fraud detection and applied to a capture of the digitized signals, the algorithms described above, which come under functions of the authentication module, can be applied to a processor embedded on the user equipment or on the remote server.

The above analyses are advantageously aided by the use of information external to the GNSS reception stages, such as, for example, external motion or attitude sensors, mappings and assistance information emanating from a network or a server, etc.

By virtue of the implementation of the invention, it is possible to differentiate the phenomena sought from the natural effects of the multiple paths by virtue, on the one hand, of the multitude of satellites (the signals from all the satellites are not simultaneously affected by the spoof), and on the other hand, by virtue of the correlation with the pseudo-random sequence which drives the modifications of the properties of the antenna or antennas.

FIG. 7 illustrates the time sequencing of the computations of the processing module and of the authentication module, according to a number of embodiments of the invention.

It also illustrates a difference from the prior art commented on above which makes it possible to apply the invention to receivers whose hardware configuration has not been significantly modified.

The reference 710 illustrates the frequency at which the processing module performs the processing operations 530 to 560 and the authentication module performs the authentication processing operation 570, that is to say the frequency at which the raw RF data are sampled, the data $\Phi_k/A_k$ are sent to the server and the authentication procedure is carried out. This frequency can be chosen by the operator or by the user of the service. The operator can have this frequency varied according to the time bands and the geographic areas to which the service is supplied. The user may also want his or her position and/or his or her velocity and/or his or her time (PVT) to be authenticated only when he or she performs certain transactions, but not continuously, for reasons of confidentiality and/or for energy saving reasons. A frequency of the order of a minute would appear sufficient for most applications. His or her PVT will be able to be determined jointly, or else independently as is done conventionally on the non-authenticated mass market receivers.

The numeric reference 720 illustrates the sampling frequency of the PVT computation. This frequency is normally of the order of a few seconds.

The numeric reference 730 illustrates the differences of frequency of the two computations, the authentication computation 710 and the position computation 720. Between two authentication computations, the GNSS signals received by the processing module are considered as authentic. Thus, according to the invention, contrary to the embodiments of the prior art already cited, the authentication processing operations and the PVT processing operations are therefore decoupled. In effect, in the prior art, the low-level components of the GNSS signal receiver have to be modified and they will operate at the clock frequency of the receiver.

Figure 8:
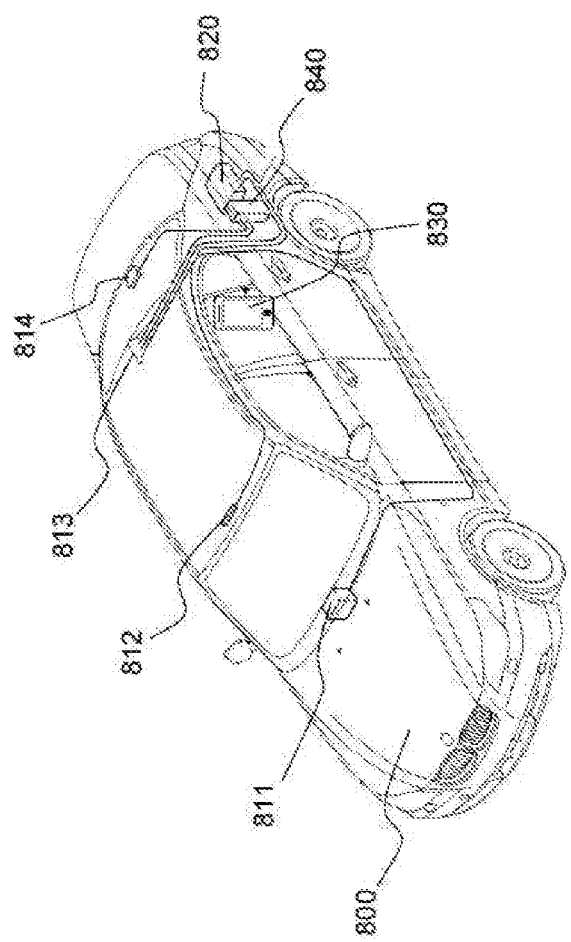
FIG. 8 illustrates an exemplary implementation of the invention in a land vehicle.

FIG. 8 illustrates an exemplary implementation of the invention in a land vehicle.

The vehicle 800 is equipped with a GNSS signal processing module 820. It is also equipped with one or more antenna cables/units 811, 812, 813, 814. A driver or a passenger can have a smart phone 830 which will be able to execute some of the functions of the processing module 330 of the system according to the invention. In this embodiment of the invention, an external unit 840 is added to the receiver to perform the functions of driving of the antennas and of sampling of the raw RF signals, $\Phi_k/A_k$, under the control of the smart phone 830. Preferably, the unit 840 performs the function of a repeater of the raw RF signals. The codes $PRN_{1+2}$, $PRN_1$, $PRN_2$ are generated in the smart phone. The code $PRN_{1+2}$ is sent to the unit 840 to drive the antennas. The data extracted from the processing module 820 by the unit 840 are encrypted with and then sent to the smart phone. The data analysis functions can be distributed between the unit 840, the telephone 820 and the server. It is the telephone which normally manages the exchanges with the server. According to a simplified variant, a single common PRN code is used: $PRN_{1+2}=PRN_1=PRN_2$. The PVT can also be determined on the telephone. For issues of compatibility with old equipment, the unit 840 can perform some of the processing operations and supply either the raw RF signals, or the raw RF data in the RINEX (Receiver Independent EXchange Format) format for example as well as a PVT. Thus, the old equipment will be able to receive the PVT, for example in the NMEA (National Marine Electronics Association) format.

Figure 9:
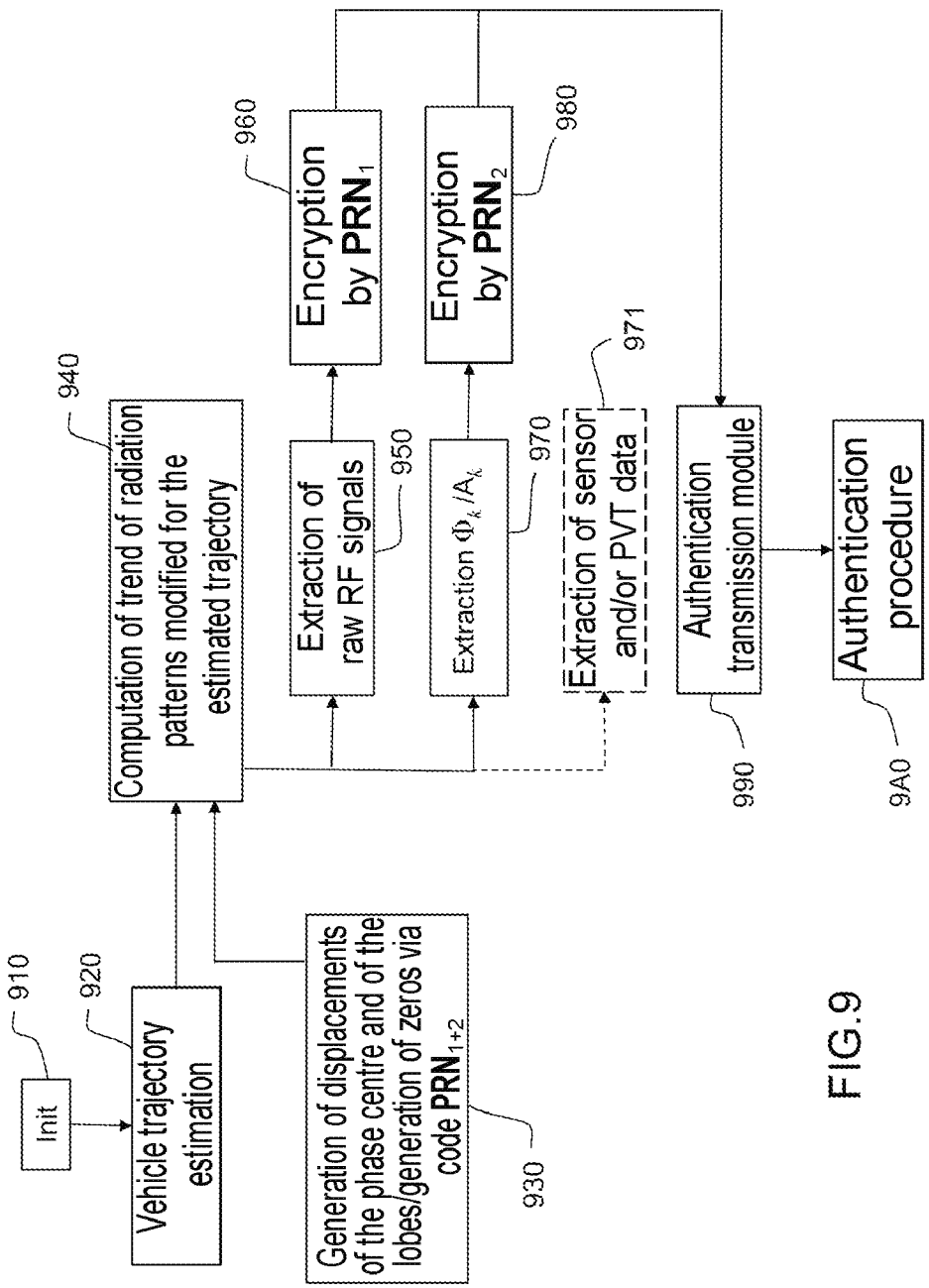
FIG. 9 represents a flow diagram of the processing operations for implementing the invention in the example of FIG. 8.

FIG. 9 represents a flow diagram of the processing operations to implement the invention in the example of FIG. 8.

During an initialization step 910, the configuration parameters of the antenna or antennas 811, 812, 813, 814 (positions, attitudes, electromagnetic characteristics), of the reception unit 820 and of the external unit 840 are supplied to the system.

A radiation pattern when the vehicle is immobile is produced therefrom and, when the vehicle moves, it is possible to estimate a trajectory of the vehicle (6 axes) during a step 920. A transfer function known to those skilled in the art makes it possible to deduce, from the radiation patterns at rest and from the estimated trajectory, radiation patterns in motion. The combination of this transfer function with the pseudo-random code $PRN_{1+2}$ sent to the unit 840 by the smart phone 830 during a step 940 makes it possible to obtain the modified radiation patterns. In parallel, as described as commentary to FIG. 5, the raw data and $\Phi_k/A_k$, are extracted during steps 950, 970. The raw RF data can be digitized. The raw RF data and the $\Phi_k/A_k$ data, sensors and/or PVT, can be encrypted with keys $PRN_1$ and $PRN_2$ during steps 960, 980, notably if most of the functions of the authentication module are installed on a remote server. These encrypted data are transmitted to the authentication module (step 990), which performs the authentication procedure (9A0) comprising the checks of consistency between the raw data, the measured phase data, and the sensor data and/or the PVT data, by comparison with the values supplied by the modelings of these data, as indicated above. As indicated previously, the RINEX format is preferentially used for the raw RF data. The other sensors also use this format, as is the practice in the case of GNSS hybridation with accelerometers, magnetometers, podometers, gyroscopes, or even altimeters and barometers. According to a simplified variant, a single common PRN code is used: $PRN_{1+2}=PRN_1=PRN_2$. For issues of compatibility, with certain equipment, the data from the sensors or the PVT can be transmitted without encryption by $PRN_2$.

Figure 10:
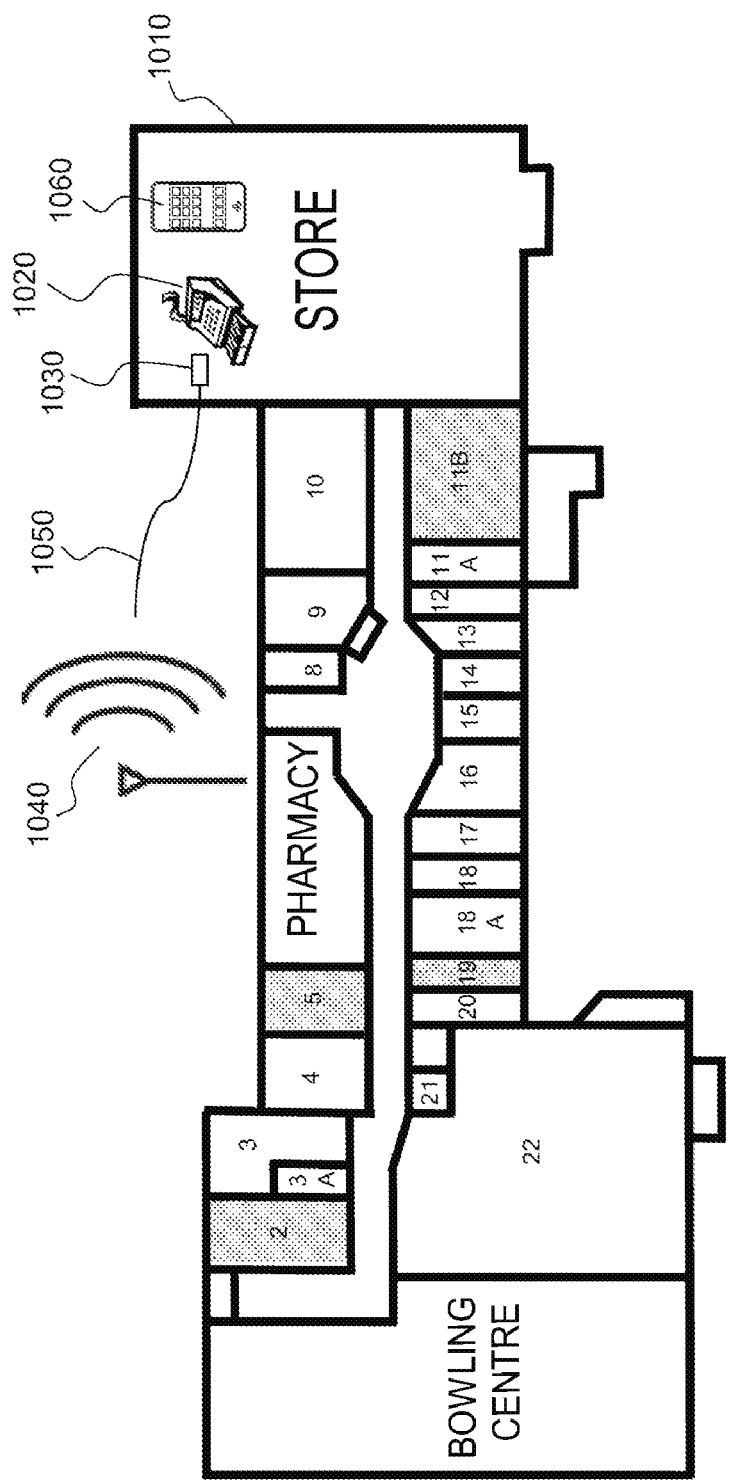
FIG. 10 illustrates an exemplary implementation of the invention for authenticating a payment transaction.

FIG. 10 illustrates an exemplary implementation of the invention to authenticate a payment transaction.

The GNSS signals include a precise time reference which is used increasingly to time-stamp the transactions. The payment transactions therefore constitute a scenario of use of the invention.

In a store 1010 of a commercial centre represented in the figure, an electronic payment terminal (TPE) 1020 is linked to a unit 1030, which comprises a GNSS signal receiver 320 configured also to implement some of the functions, notably antenna control, and possibly analysis of some of the data, of the processing module 330. One or more antennas 1040, which can for example be situated on the roof of the commercial centre, are linked to the unit 1030 by a connection 1050, which can be an element of the local area network of the commercial centre. A client of the store, subscriber to the authentication service and provided with a smart phone 1060, who reports to perform a purchase that he or she intends to settle by an electronic means, makes his or her purchase, then his or her payment. The payment can be made by bank card, by transaction using his or her mobile phone (via a Near Field Communication—NFC—or via a QRCode sent by an application of his or her smart phone). The transaction is then authenticated by a signal generated by the TPE, which concomitantly acquires location and time-stamping data from the GPS system. The GPS signal is authenticated by the method of the invention, by using the functions distributed between the assembly comprising unit 1030, antenna 1040, smart phone 1060 and server of the operator of the GNSS signal authentication service (not represented in the figure). As a variant, the authentication can be based on authentication data previously determined by the telephone of the client so as to be assured that the telephone has indeed gradually approached the payment terminal and that it has not just appeared alongside the terminal even though it was several tens or hundreds of kilometres away in the preceding minutes or hours. As a variant, data from intrusion prevention sensors or even acceleratomers and/or magnetometers on the antennas 1040 and/or the unit 1030 are used in place of or in complement to the PVT to determine any violation of the integrity of this part of the system (tampering).

Figure 11:
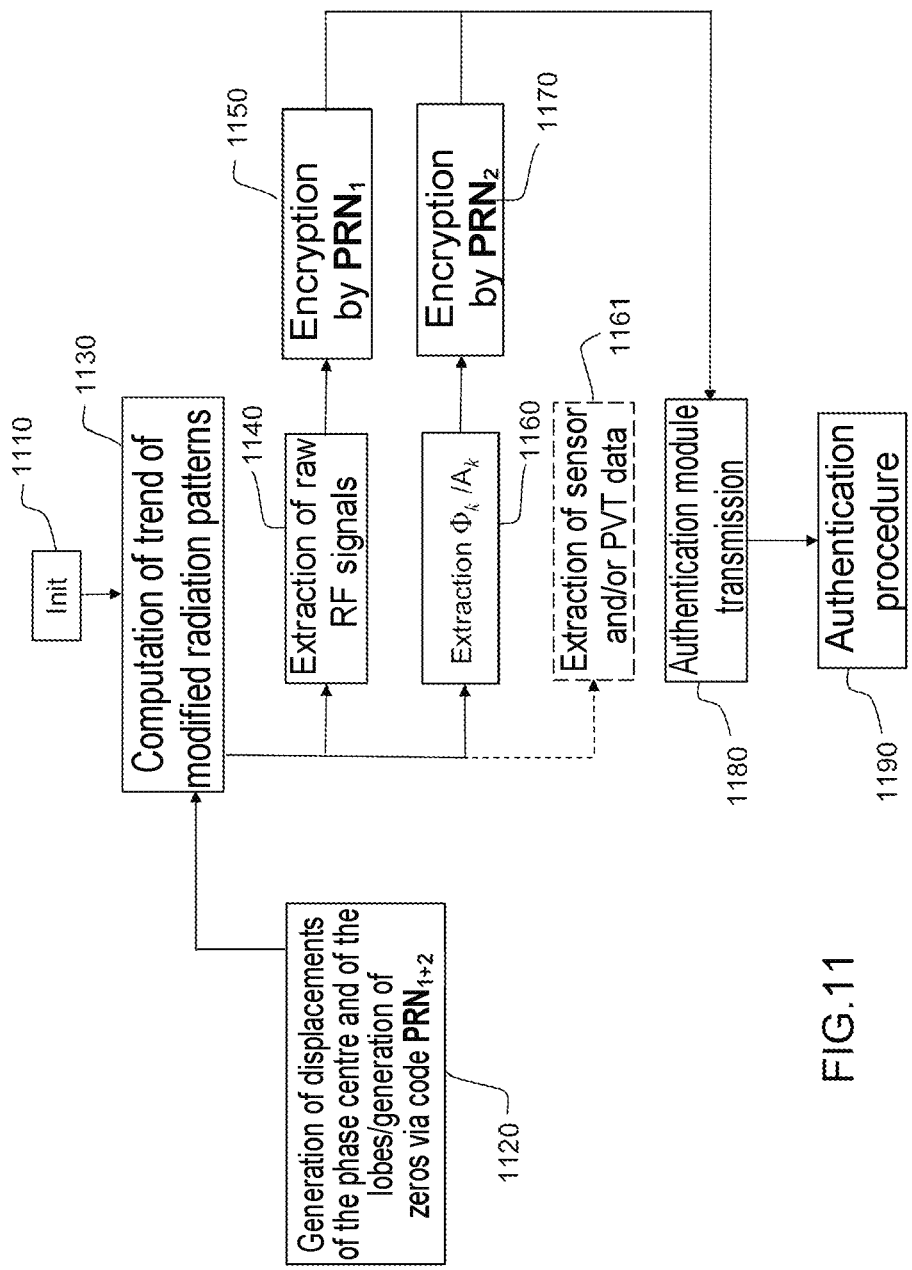
FIG. 11 represents a flow diagram of the processing operations for implementing the invention in the example of FIG. 10.

FIG. 11 represents a flow diagram of the processing operations to implement the invention in the example of FIG. 10.

During an initialization step 1110, the configuration parameters of the antenna or antennas 1140 (positions, attitudes, electromagnetic characteristics), of the reception module and of the processing module contained in the external unit 1130 are supplied to the system.

A radiation pattern is deduced therefrom when the antenna device 1140 is not excited by the unit 1130. As in the scenario of use commented on in conjunction with FIG. 9, the combination of this radiation pattern in the absence of excitation with the pseudo-random code $PRN_{1+2}$ sent to the unit 1130 by the smart phone 1160 during a step 1120 makes it possible to obtain the modified radiation patterns. In parallel, as described in commentary to FIG. 5, the raw RF signals and $\Phi_k/A_k$, are extracted during steps 1140, 1160. The raw RF signals can be digitized. The raw RF signals and $\Phi_k/A_k$, sensors and/or PVT can be encrypted with keys $PRN_1$ and $PRN_2$ during steps 1150, 1170. These encrypted data are transmitted to the authentication module (step 1180), which performs the authentication procedure 1190 comprising the checks of consistency between the raw data, the measured phase data and the data from the sensors and/or PVT, by comparison with the values supplied by the modelings of these data.

The payment transaction can therefore be definitively authenticated.

The examples described above are purely illustrative of some of the embodiments of the invention. They in no way limit the scope of the invention which is defined by the following claims.

The invention claimed is:

1. A method for authenticating GNSS signals received by a receiver, said method comprising:
   generating control sequences emulating a scanning of a reception cone by at least one GNSS signal reception antenna;
   transmitting raw RF signals at the output of the at least one GNSS signal reception antenna to an authentication circuit logic configured to authenticate said raw RF signals;
   acquiring, in-phase with the control sequences, raw data representative of said GNSS signals, said raw data comprising one or more data representative of a phase angle, a phase centre, an amplitude or a carrier power;
   transmitting to the authentication circuit logic a message containing said raw data representative of said GNSS signals;
   producing by the authentication circuit logic of a GNSS signal authentication certificate by a processing receiving as input at least said raw RF signals at the output of said at least one reception antenna and said raw data representative of said GNSS signals.

2. The method of claim 1, wherein the control sequences are generated by a pseudo-random code produced by an encryption key.

3. The method of claim 1, wherein the message transmitted to the authentication circuit logic also comprises PVT data to locate the receiver.

4. The method of claim 1, wherein the scanning of a reception cone comprises a generation of attenuated signals in at least one direction of said cone.

5. The method of claim 1, wherein the raw RF signals at the output of said at least one GNSS signal reception antenna are digitized before transmission to the authentication circuit logic.

6. The method of claim 5, wherein the digitized RF signals at the output of the digitization step are encrypted by at least a first part of the encryption key, before transmission to the authentication circuit logic.

7. The method of claim 1, wherein said raw data representative of the GNSS signals are encrypted by at least a second part of said encryption key, before transmission to the authentication circuit logic.

8. The method of claim 1, wherein the production of the GNSS signal authentication certificate is performed only if the latter satisfies a test of consistency TC2 of the directions of arrival measured by the receiver with expected directions determined by a model deduced from the control sequences emulating the scanning of a reception cone.

9. The method of claim 1, wherein the production of the GNSS signal authentication certificate is performed only if the latter satisfies a test of consistency TC3 of the powers, amplitudes and/or signal-to-noise ratios measured in directions of arrival measured by the receiver with expected powers, amplitudes and/or signal-to-noise ratios in expected directions, these parameters being determined by a model deduced from the control sequences emulating the scanning of a reception cone.

10. The method of claim 1, wherein the production of the GNSS signal authentication certificate is performed only if a test of consistency TC is satisfied, said test being defined by a linear combination of the tests of consistency TC1, TC2 and TC3, the weightings of said tests TC1, TC2 and TC3 being defined as a function of one or more of a GNSS signal reception quality indicator and of a position of the receiver module estimated by a localization procedure not using the GNSS signals.

11. The method of claim 10, wherein the localization procedure not using the GNSS signals is one or more of a terrain mapping, an inertial unit measurement, an identification of a radio communication network cell or of a Wifi terminal.

12. The method of claim 1, further comprising, when there is an index of presence of non-authentic GNSS signals, analyzing the inter-channel correlation peaks on the raw signals at the output of said at least one reception antenna.

13. A system for authenticating GNSS signals comprising:
   one or more antenna arrangements, each antenna arrangement comprising at least one reception antenna;
   one or more GNSS signal receivers, each receiver configured to supply as output raw data representative of said GNSS signals, said raw data comprising one or more data representative of a phase angle, a phase centre, an amplitude or a carrier power;
   one or more processing circuit logics configured to generate a control sequence emulating a scanning of a cone of reception of said signals by the antenna arrangement, said control sequences in-phase with the supply of the raw data representative of said GNSS signals;

authentication circuit logic configured to produce a GNSS signal authentication certificate by a processing receiving as input at least raw RF signals at the output of said at least one reception antenna and said raw data representative of said GNSS signals.

14. The system of claim 13, comprising a server, said server to manage encryption keys and at least some of the functions of the at least one authentication circuit logic.

15. The system of claim 13, wherein at least one or more of the antenna arrangements or the receivers are located in terrestrial motor vehicles.

16. The system of claim 13, comprising a plurality of processing circuit logics, at least some of the receivers being linked to an electronic payment terminal.

17. A GNSS signal authentication equipment, comprising:
a digital port configured to receive encryption keys;
signal processing logic configured to acquire, at a predetermined sampling frequency:
raw RF signals at the output of at least one GNSS signal reception antenna,
raw data representative of said GNSS signals, said raw data comprising one or more data representative of a phase angle, a phase centre, an amplitude or a carrier power,
a processing circuit configured to:
generate a pseudo-random code from an encryption key, said code being itself configured to generate a control sequence emulating a scanning of a reception cone by said at least one GNSS signal reception antenna, said control sequence in-phase with the acquisition of the raw data representative of said GNSS signals;
acquire or produce a variables state model at the output of the signal processing logic, said state model being adapted to the control sequence;
execute at least one test of consistency between at least a part of the data measured at the output of the signal processing logic and their state model.

* * * * *